May 11, 1965 R. M. BLOCH ETAL 3,183,488

DATA PROCESSING APPARATUS

Filed Sept. 26, 1958 7 Sheets-Sheet 1

INVENTORS
RICHARD M. BLOCH
ALAN J. DEERFIELD
LYNN W. MARSH, JR.
BY Henry L. Hanson
ATTORNEY INVENTORS
RICHARD M. BLOCH
ALAN J. DEERFIELD
LYNN W. MARSH, JR.
BY Henry L. Hanson
ATTORNEY INVENTORS
RICHARD M. BLOCH
ALAN J. DEERFIELD
LYNN W. MARSH, JR.
BY [signature]
ATTORNEY INVENTORS
RICHARD M. BLOCH
ALAN J. DEERFIELD
LYNN W. MARSH, JR.
BY Henry L. Hanson
ATTORNEY INVENTORS
RICHARD M. BLOCH
ALAN J. DEERFIELD
LYNN W. MARSH, JR.
BY Henry L. Hanson
ATTORNEY INVENTORS
RICHARD M. BLOCH
ALAN J. DEERFIELD
LYNN W. MARSH, JR.
BY Henry L. Hanson
ATTORNEY INVENTORS
RICHARD M. BLOCH
ALAN J. DEERFIELD
LYNN W. MARSH, JR.
BY Henry L. Hanson
ATTORNEY United States Patent Office 3,183,488

Patented May 11, 1965

3,183,488

DATA PROCESSING APPARATUS

Richard M. Bloch, West Newton, Alan J. Deerfield, Franklin, and Lynn W. Marsh, Jr., Marblehead, Mass., assignors to Honeywell Inc., a corporation of Delaware Filed Sept. 26, 1958, Ser. No. 763,563
15 Claims. (Cl. 340—172.5)

A general object of the present invention is to provide a new and improved apparatus for the handling and manipulating of digital data in a data processing apparatus. More specifically, the present invention is concerned with a new and improved apparatus for manipulating digital data by way of apparatus which is adapted to be set up in a multiplicity of ways by manual plugboards wherein the apparatus is characterized by the flexibility and ease with which the manual setup may be accomplished to effect the desired data manipulation.

A representative type of apparatus wherein the present invention finds a high degree of utility is an apparatus for controlling the format in a digital data printer. In the normal type of printer control apparatus, data is received from a suitable data source in a particular form. In the case of data which may be recorded on a magnetic tape, the data is generally arranged with no attempt made to put it in a form in which it may be desired to print it at the output. Consequently, the data which is read from the storage medium, such as a magnetic tape, is passed through a suitable converter which contains appropriate data manipulating facilities for feeding data to a utilization mechanism, such as a printer, so that characters or numbers which are to be printed will appear at selected lines and positions on the final output form on which the printing takes place.

One manner of distributing chracters received from a storage medium to appropriate positions in any one line of print is by way of a manual plugboard. Such a plugboard may be referred to as a horizontal format board. It has been the practice heretofore to arrange such a horizontal format board so that each character to be printed was individually manually plugged to its desired position in the format. Thus, if twenty characters were to be positioned in a particular print location in a line of print, twenty individual connecting wires would be required. In accordance with the teachings of the present invention, the information is treated in accordance with fields which define groups of sensible information. By treating data groups in field, it has been necessary to define on a plugboard only the beginning and end of the field.

It is therefore a further more specific object of the present invention to provide a new and improved apparatus for manipulating digital data by way of a manual plugboard wherein the information is treated in terms of sensible information groups which may be defined as fields.

A still further more specific object of the present invention is to provide an apparatus wherein the information from a storage source may be transferred to selected positions in a storage or readout mechanism by way of a manual plugboard wherein fields of data are defined in the plugboard only in terms of a starting position and an end position.

In accordance with a further teaching of the present invention, the selection of a particular field is accomplished by way of a control register which is adapted to contain selected control bits in what may be termed a control word. The control word may be derived manually or by way of some storage medium and is useful in defining the location and size of fields desired in a particular format as well as other control information. This control word also may be used by the operator by way of a plugboard to establish multiple variably selected fields or multiple fields for each individual field position depending upon the particular bit stored at a selected location in the control word in the register.

It is accordingly a further object of the present invention to provide a format control circuit comprising a storage register adapted to contain the control bits of information which are adapted to be scanned by a control circuit for selectively establishing one or more fields of information to be associated with any particular conversion operation.

As taught by the present invention, the basic principle of selective field control has been extended to permit an operator using the apparatus to locate a field in a first set of print locations if a control bit is a one, or in a second set of print locations if a control bit is a zero. In addition, the circuits may be arranged so that the start of a field may be at a set of print locations independently of which type of bit may be in control of the field. Thus, two fields may be defined or established directly from a single control bit. As will be apparent from the description that follows, the number of fields relating to a single control bit may be increased beyond two by way of the plugboard and the associated circuitry. Further, the order in which the fields are arranged is not restrictive but will be in the order in which the plugging is arranged by the operator.

In a similar manner, the field or fields which have been selected may be conditionally ended or unconditionally ended depending on how the circuit has been manually plugged.

Another feature of the invention is that more than one field control bit may operate on one particular unit of information. Thus, a first field may be conditionally defined by a one bit. If the one bit is not present, the next field control bit may be examined effectively immediately so that this control bit will be used to select the field or fields for such information. This feature further enhances the flexibility and thereby the utility of the apparatus.

It is then a further object of the present invention to provide a new and improved data handling apparatus wherein the data may be treated in terms of selective fields of data and when such fields may be selectively arranged in format, number, or eliminated in accordance with examined field control bits and a manual plugboard.

In certain types of data processing operations involved particularly in the printing of information on the output, it is frequently desired that a plurality of field combinations be available in translating certain data to an output printed form. Heretofore, it has been necessary that certain forms be passed through the printing operation a number of times when the information used in the printing was to be arranged in a different manner at different points on the form. In accordance with the teachings of the present invention, means are provided for selecting one of a plurality of horizontal format boards, each of which may be independently manually plugged for selected forms with the selection of the format board being controlled by signals derived from control bits in the control register.

A further object of the invention is therefore to provide a data manipulating apparatus incorporating a plurality of format boards, each of which may be manually plugged, wherein the control data for the boards is selectively examined and one of the plurality of boards selected in accordance with the control data.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
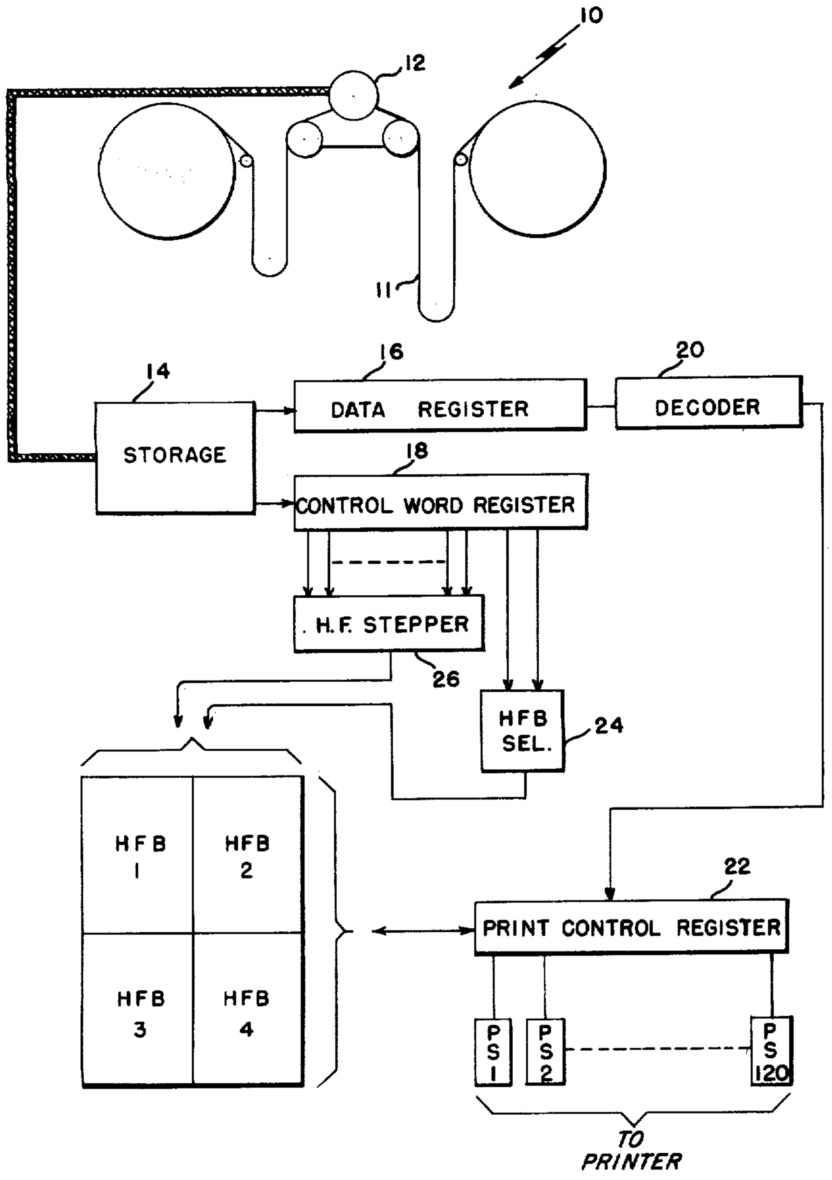
FIGURE 1 is a diagrammatic representation of a portion of a system which is adapted to incorporate the principles of the present invention.

Referring to FIGURE 1, the numeral 10 identifies a bulk information storage and transfer apparatus which may well contain data which has been magnetically recorded on a magnetic tape 11. Data is read from the tape by a reading head 12 as the tape 11 moves past the latter and is then transferred from the head 12 through suitable reading circuitry, not show, to data storage, the latter of which may comprise a series of shift registers or other storage means well known in the art. In the case of a multiple channel record on tape 11, the data derived from the tape may include information which is to be printed on a suitable output form as well as data which is to be used for controlling the printing on the output form. Consequently, on the output of the storage means 14 there is provided a pair of registers comprising a data register 16 and a control word register 18. The data in the data register is adapted to be passed through a suitable decoder 20 which will provide for converting selected bit groups from the data register into a predetermined code compatible with and suitable for operating an output printer. The data from the decoder is gated into one of 120 possible print storage locations PS1–PS120 by way of a print control register 22.

The activation of a selected print storage location PS is determined by signals derived from one of four horizontal format board HFB1–HFB4. The particular horizonal format board which has been selected will be determined by signals derived from the control word register 18 as sensed by the horizontal format board selector circuit 24. Once a particular horizontal format board has been selected, the individual fields to be selected are determined by a horizontal field stepper 26, the latter also deriving control information from the control word register 18.

The apparatus thus far described may be considered to operate in the following manner. Data from the tape 11, as well as control information, is read from the tape and passed through storage into the data register 16 and the control word register 18. Once the control data is in the control word register 18, selected bits of this data are examined and a particular one of the four horizontal format boards HFB will be selected by the selector circuit 24. Once selected, the horizontal field stepper 26 makes a selective examination of predeterined bit positions in the control word register 18 and the signals therefrom are supplied to the selected horizontal format board. By way of manual plugging on the horizontal format board selected, a starting position for loading the print storage circuits PS will be determined. Thus, if the horizontal format board HFB1 is selected, and the first field therein is arranged to start at print storage PS1, the first data from the decoder 20 will be inserted in the print storage location PS1. If on the horizontal format board the end of the field is defined as print storage PS20, data from the decoder 20 will continue to drop into successive print storage locations PS1–PS2, etc. until the final character has been inserted into the print storage location PS20 which has been defined as the end of a particular field. At this time, control signals are generated, as will be defined more specifically hereinafter, to indicate that an end of field condition has been reached. The apparatus will then provide for the stepping of the horizontal field stepper 26 so that a further field starting position may be determined. This stepping will continue until such time as all of the fields defining selected groups of print storage have been completed for a particular line which is to be printed.

Figure 2:
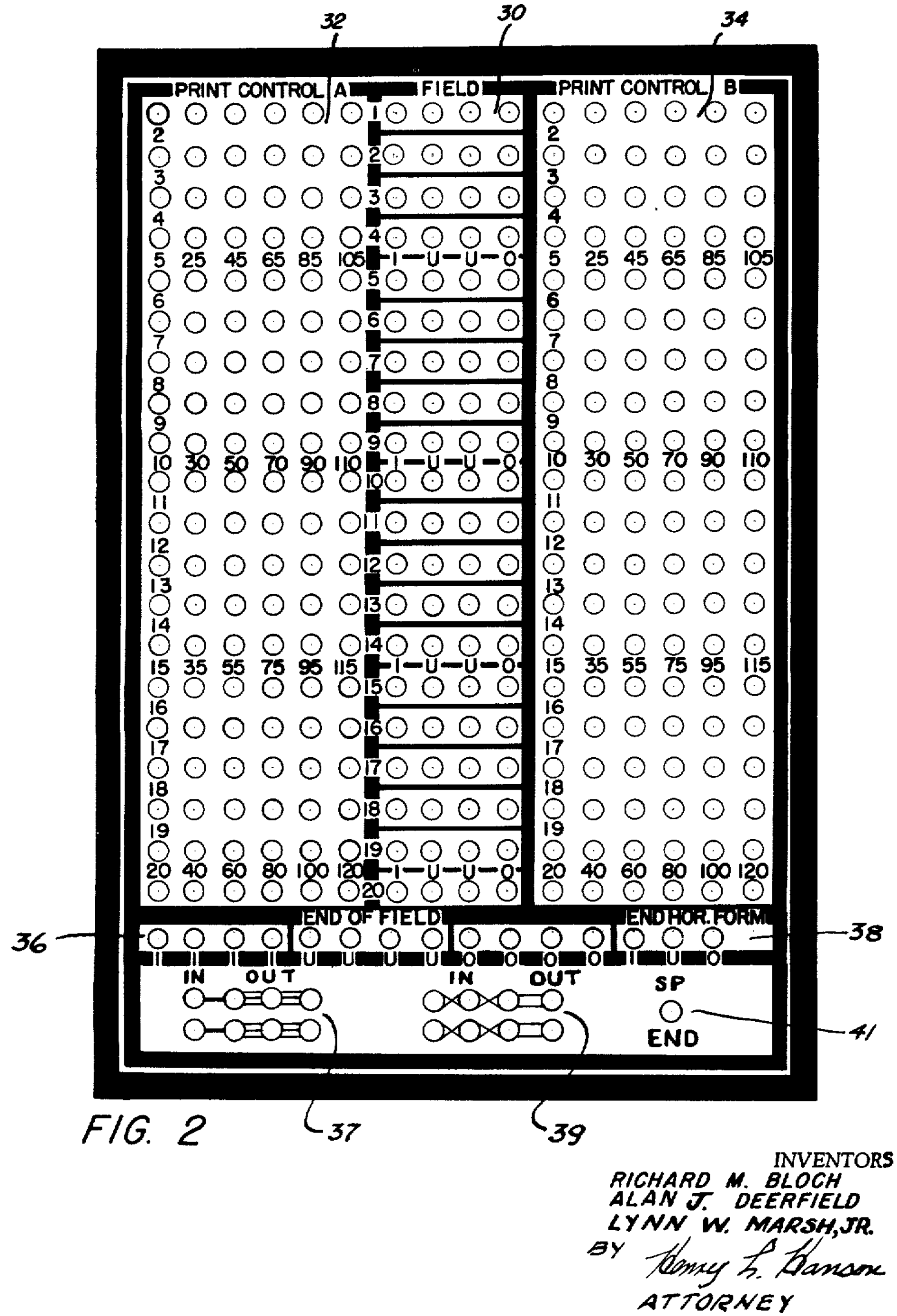
FIGURE 2 is an illustration of a section of a horizontal format board which is adapted to be used with the present invention.

Referring next to FIGURE 2, there is here illustrated a detail of one of the manual plugboards which may be used for establishing the horizontal format. As illustrated, this horizontal format plugboard has five major sections. The first section is the field selection section 30, said section having twenty positions, each with four individual holes for use in plugging for each of the fields which may be selected. The holes in each position are adapted to be selectively associated with the control bits in the control word register 18. The left hold of the four is the hole which is adapted to be associated with a one bit in a predetermined position in the control word register. The second and third holes from the left are unconditional holes in that a field will be selected at that position if the related control bit in the conrol word register is either a one or a zero. The fourth hole from the left is the zero bit hole and will define the start of a field if the associated control bit for that field is a zero in the control word register.

The second major section of this horizontal format board is the print control A section 32. This section has 120 holes each of which are associated with the 120 print storage locations PS illustrated in FIGURE 1. This particular section defines the field starting position for any particular group of sensible information bits fed from the decoder into print storage. Thus, if a programmer or operator of the associated equipment wanted a particular field to start at position 10, and the field was the first field, a manual plugging would be made in the first field position to the position 10. This manual plugging is by way of an electrical coupling wire which, in this case, would be plugged into one of the four holes in the field position and into the hole 10 of the print control A section 32 where a further electrical connection leads to associated electrical circuitry illustrated hereinafter. It will be apparent that if there are 20 fields defined that these fields may be plugged in any desired manner, with the exception that selected fields should normally not be overlapping in any position where they may be valid information from more than one field.

The next major section of this horizontal format board is the print control B section 34. This section, as well as section 32 comprises 120 holes each of which are adapted to define electrical connecting points to associated electrical circuitry described hereinafter. This particular section 34 is associated with the apparatus to define the points wherein any particular field is to end. This section co-operates directly with a further end of field section 36, the latter comprising a total of 12 holes or hubs defining electrical connections in the circuitry described hereinafter. In using the print control B section 34 and the end of field 36, a programmer will manually plug the desired print control location from section 34 to the end of field section 36.

In actually using the sections thus far described, assume that a programmer desires that the first field be unconditionally started at print storage location 10. To do this, an electrical plugboard wire will be plugged from one of the unconditional holes or hubs in the first field position of section 30 to hub 10 in the print control section A or section 32. If the programmer intends that a total of ten characters be positioned in successive locations in print storage thereby defining a field, a further plugboard connection will be made from the hub 19 of print control section B or section 34 to one of the unconditional hubs of the end of field section 36. Thus, a total of ten characters will be transferred in the print storage locations PS starting at position 10 and ending at position 19. It will be apparent that a programmer can use the full 120 print storage locations in sequence if he plugs the board to start at position 1 and end at position 120. A programmer may also set up a field of a single character position by defining the starting and stopping points at the same number in print control sections A and B.

The plugboard of FIGURE 2 also includes a section for multiplying or multiplexing the number of places where data may be inserted in print storage. This added section 37 may be referred to as a signal divergence or commoning sections having a single input and a plurality of outputs. To multiplex the fields, a manual connection is made from the desired field hub to an input terminal in section 37. The output terminals associated therewith are then plugged to the field starting position hubs in section 32 to define the starting point of such fields. The field end may be plugged from the end position of any one of the fields to the end of field section 36.

In the second field to be selected in print storage, it is assumed that a conditional selection has been made in that a one must be in the related field position in the control word register. Thus, if the second field is to be defined as starting at position 25, a manual plugging will be made from the one hub of the second field position in the field section 30 to the hub 25 in section 32. If the second field is to end at position 30, a plugboard connection will be made from the hub 30 of section 34 to the end of field section 36 at the one hub available in the section 36.

When a field is started conditionally, it is necessary that steps be taken to effect a control action if the condition called for is not met. Thus, if a plugging is made from the one hub in the field section 30, the absence of a one, i.e., the presence of a zero, must be recognized. If a zero is present, this fact may be used to establish an alternate field to that of a one. Further, the zero may be used to direct the bypassing of the field entirely by plugging the zero to the special end SP-END hub 41. Obviously the one and unconditioned hubs, as well as the zero hub, in any field position may be used to effect a special ending of the field by, in effect, eliminating it entirely and stepping on to the next field position.

When a conditional field selection is not made at one field position, and the field is then bypassed by the special end hub 41, the information which might have gone into the one field will be handled in accordance with the next field control bit. In this way, the number of field location selections for a particular information group may be increased considerably.

For example, it is assumed that field one is plugged from the one hub to print control section A at hub 90. Further, the zero hub of field one is plugged to the SP-END hub 41. If a zero is the control bit for field one, the apparatus steps to field two to check the control bit for this field. Here, the field two may be, for example, plugged unconditionally to start at position 25, and/or conditionally at position 85 if there are a one control bit and at position 95 if there is a zero control bit. Thus, two fields will be printed as defined by the plugging at the field two position of section 30. This may be extended through the other fields defined by section 30.

If the third field to be selected is one which is conditional and is dependent upon there being a zero in the control word register 18 at the associated field position, a manual plugging will be made from the zero hub of position 3 in the field section 30 to an appropriate starting position, such as position 50 in the print control section 32. If this particular field is to end at position 60, a manual plugging will be made from the hub 60 in section 34 to the end of field section 36 in one of the zero hubs, inasmuch as the field was started with a zero.

It will be apparent that any field may be started at a different point depending on whether a zero or a one is in the associated control word register position and a separate plugging may be made to define two separate fields in different locations. The programmer must, however, be consistent in plugging the end of a field to correspond to the beginning of a field.

It will be apparent that the number of end of field hubs in section 36 is less than the total number of fields that may be selected by a programmer. To take care of this, the normal horizontal format board will contain a plurality of "or" circuits or hubs as illustrated at 39 whereby certain functions may converge in their availability insofar as the end of field is concerned.

The programmer will wire his plugboard and define the fields therein to the extent that he desires and when the final field has been defined, a manual plugging will be made from the end of field position of section 34 to a point to define the end of horizontal format. The end of horizontal format section is in the section 38 and includes three hubs, a one hub, an unconditional hub, and a zero hub.

It will be apparent from observing the layout of the horizontal format board of FIGURE 2 that the programmer or operator using this mechanism need not make an individual plugging on the plugboard for each of the characters defined in any particular field. This greatly minimizes the number of connections that must be made on the plugboard and considerably reduces the time element required for setting up any particular board. Further, the use of the control word for field selection presents the format of each line of point to be varied in any desired manner.

Figure 3:
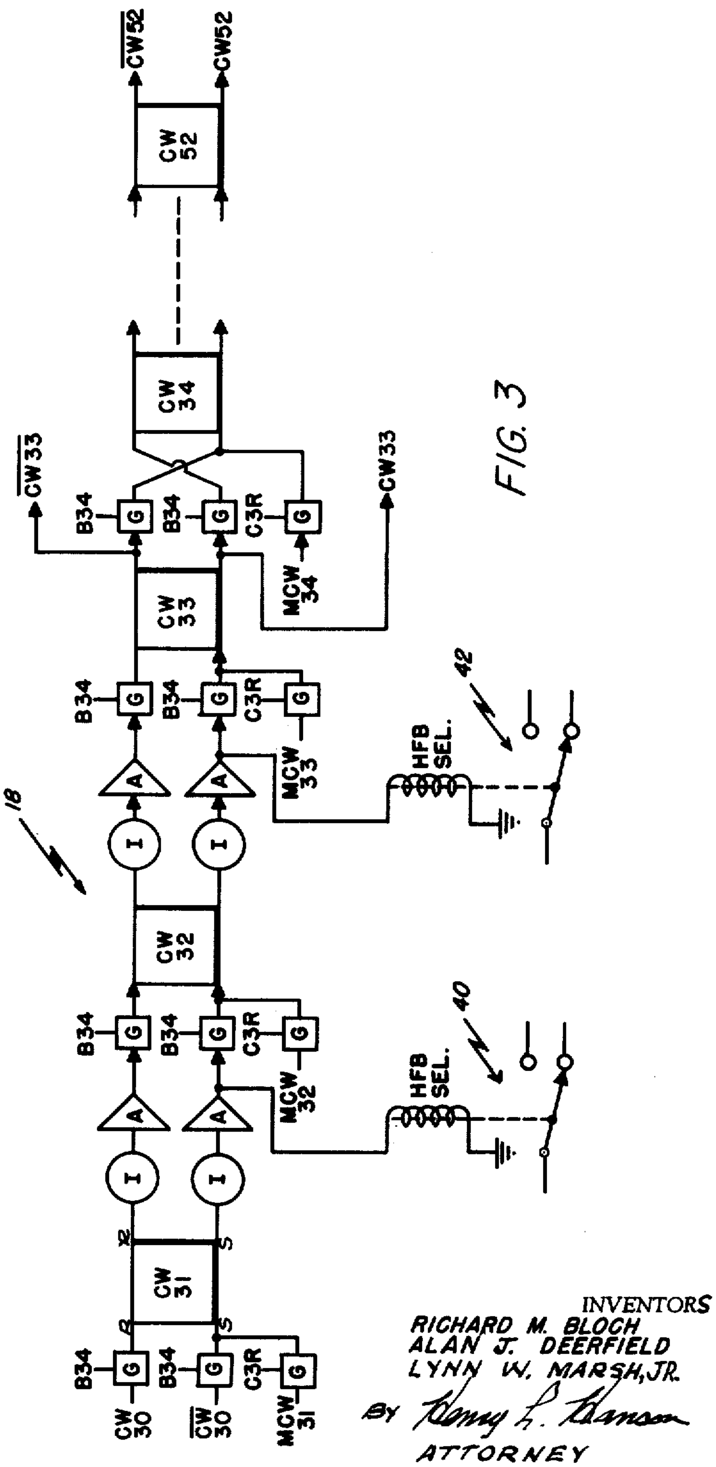
FIGURE 3 is a logical representation of portions of the circuitry used in the control word register of the present apparatus.

FIGURE 3 illustrates in greater detail the control word register 18. In the normal control word associated with one embodiment of the present invention, the word comprised fifty-two bits. Of these fifty-two bits, bits 31 through 52 were arranged to be associated with the horizontal format. Thus, by definition, bits in positions 31 and 32 are used to determine the selection of one of four possible horizontal format boards in the manner set forth above in connection with FIGURE 1. The bits 33 through 52 are in turn used to determine the particular fields to be selected in conjunction with any particular horizontal format control.

As illustrated in FIGURE 3, the control word register 18 comprises a plurality of electronic shift register stages interconnected so that data may be shifted along through the register from the storage means 14 in FIGURE 1, or may be manually loaded by a plurality of MCW inputs. The individual shift register stages CW31–CW52, as illustrated, each comprise electronic flip-flops of well known type having both set and reset inputs with an appropriate gate G connected in circuit with each of the inputs. In order to load the register from storage, data is shifted in serially, with the transfer from one stage to the next being controlled by the application of shift pulses B34 to the gates on the inputs of each of the respective stages. Inverters and amplifiers may be used on the output of each of the stages as desired to select a particular type of output from each of the stages. The stages CW31 and CW32 each include inverters and amplifiers on the output for the reason that additional signal strength is required for the operating of a pair of relays HFB–SEL which are horizontal format board selection relays. These relays carry the identifying numerals 40 and 42.

Figure 4:
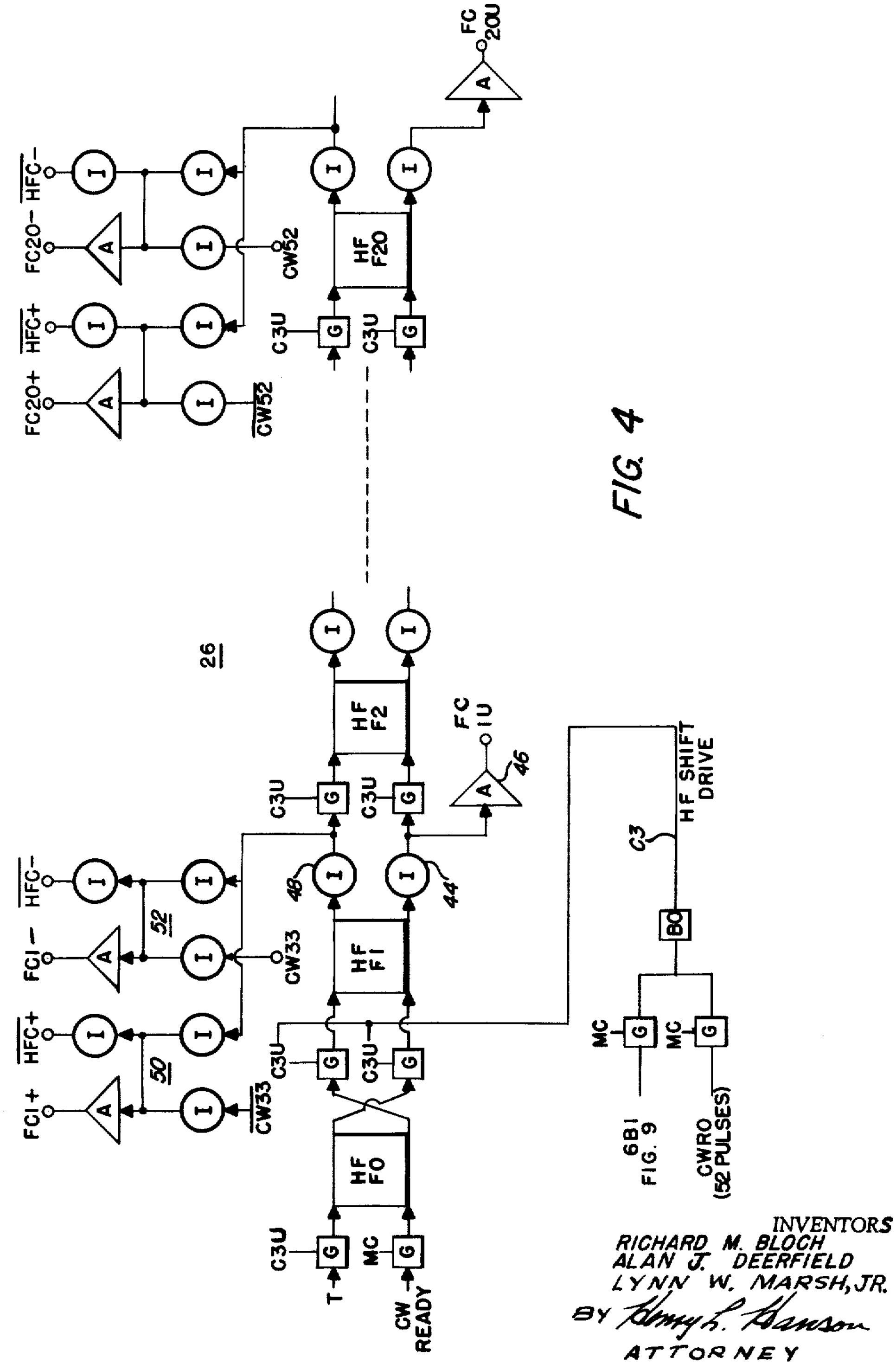
FIGURE 4 is a further register associated with horizontal field selection in the present apparatus.

The outputs of the other stages CW33–CW52 are used to supply control signals for the hubs in the field section 30 of the plugboard in FIGURE 2 by way of the circuitry illustrated in greater detail in FIGURE 4.

FIGURE 4 illustrates the horizontal format stepper 26 and the circuitry associated therewith. The basic stepper comprises a twenty-one stage serial shift register employing a plurality of flip-flops HFF0–HFF20. Gating circuits are provided on each of the inputs of the individual flip-flops and the shifting within the stepper is controlled by a C3U signal which is derived from one of two possible sources, one being the circuitry of FIGURE 9, to be discussed hereinafter, and the other being a control word readout signal in the form of fifty-two pulses, the latter actually functioning to clear this stepper register at the end of any particular conversion operation.

In use, a signal is set into the first stage HFF0 at a predetermined time when it is desired to start a particular conversion cycle. This one condition or set condition in the first flip-flop HFF0 will then be shifted into the stage HFF1. This stage has a pair of inverters on the outputs thereof. The inverter 44 has its output connected to an amplifier 46 which, when the flip-flop HFF1 is set, provides a signal to the field control section 30 of FIGURE 2 at the first position and on the unconditional hubs U. The other output of the flip-flop HFF1 is connected by way of an inverter 48 to a pair of output circuits 50 and 52. The output circuit 50 receives an inverted input from the CW33 circuit in the control word register 18 of FIGURE 3. With a $\overline{\text{CW33}}$ signal and an HFF1 signal from the output of the inverter 48, the amplifier A connected to the output of the two inverters will supply a signal to the field control section 30 at position 1, and at the one or plus hub at this position. A further output inverter is connected to the output circuit 50 and this provides a signal $\overline{\text{HFC}}$ plus, the latter signal being used in FIGURES 9 and 10 in connection with determining the end of the horizontal format as well as the end of the field.

The other output section 52 is similar to the section 50 and comprises a pair of inverters, one of which receives an inverted input from the CW33 flip-flop in the register 18 and provides a signal to the output amplifier A to produce a signal FC1 minus. A further inverter in the output circuit provides a signal $\overline{\text{HFC}}$ minus which is used in conjunction with the circuitry of FIGURES 9 and 10. The FC1 minus signal is adapted to be applied to the zero or minus hub in the field 1 position of the section 30 of the plugboard illustrated in FIGURE 2.

Figure 9:
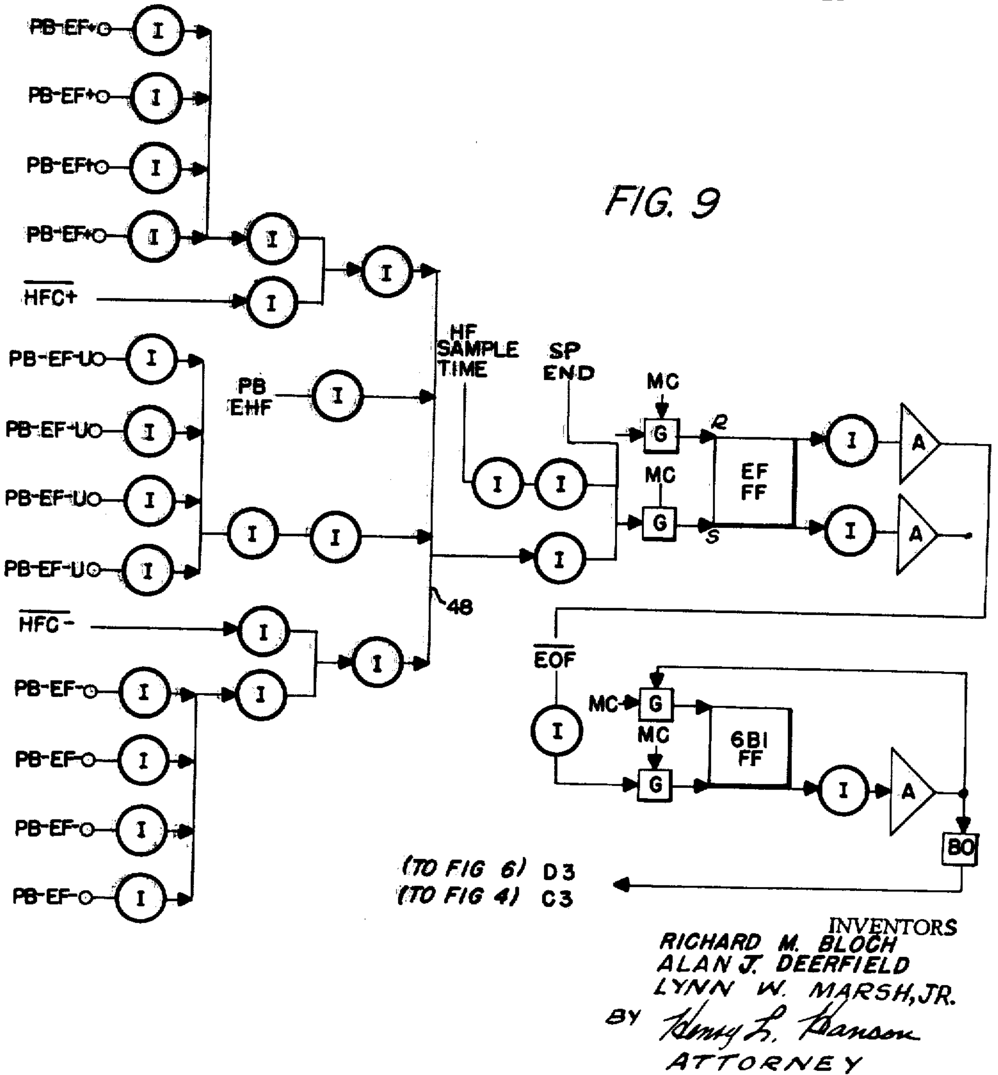
FIGURE 9 illustrates representative circuitry for indicating when an end of field condition has been reached.

As soon as an end of field condition has been received by way of the circuits of FIGURE 9, a shift signal is supplied to the gates in the stepper register and the set condition in the flip-flop HFF1 is shifted into the next field selection flip-flop HFF2. This serial shifting will continue until a total of twenty fields have been selected or until the end of horizontal format has been plugged at which time the entire register is cleared.

Figure 5:
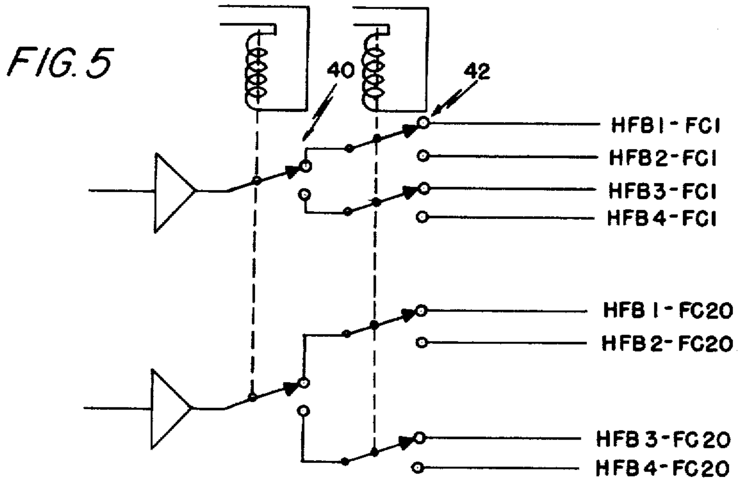
FIGURE 5 illustrates circuitry for use in selecting one of a plurality of horizontal format boards in the present invention.

The circuitry of FIGURE 5 illustrates the horizontal format board selection relay circuitry associated with the field control section 30 of the four horizontal format boards shown in FIGURE 1. Thus, as illustrated, with both of the relays 40 and 42 energized, as symbolized by a one being present in both the CW31 and CW32 flip-flops of the control register 18, the horizontal format board HFB1 will be selected. If the relay 42 should be de-energized, the horizontal format board HFB2 will be selected. If both relays 40 and 42 are de-energized, the horizontal format board HFB4 will be selected. If the relay 40 is de-energized and the relay 42 is energized, the horizontal format board HFB3 will be selected. Thus, a switching position is provided for each of the field control hubs in the section 30 of FIGURE 2.

Figure 6:
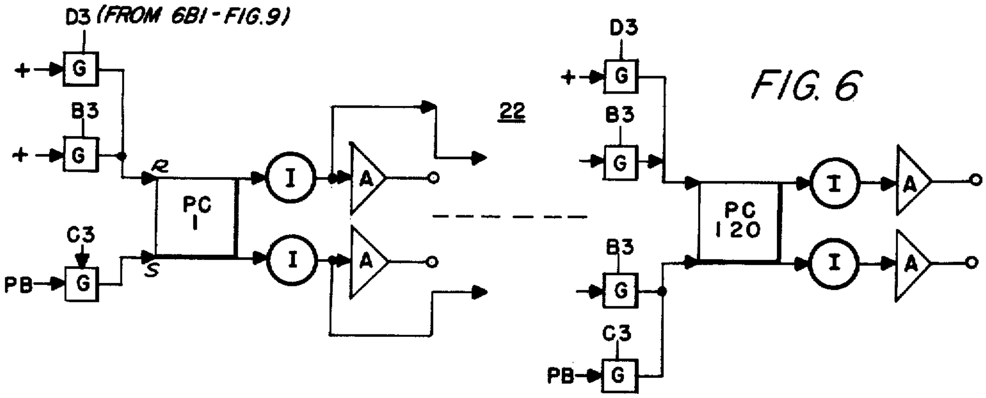
FIGURE 6 illustrates representative circuitry for use in selecting predetermined print control positions on the output of the present apparatus.

FIGURE 6 illustrates the print control register 22.

The print control register comprises a plurality of flip-flops PC1–PC120 which are connected in a serial shift register configuration. Each of the flip-flops has a plurality of input gates with each of the gates controlled by a B3 timing pulse providing for the shifting of a signal condition inserted into the register to the next stage in the sequence. Those gates having a C3 signal input are arranged to be connected to suitable hubs in the print control section A32 in the plugboard illustrated in FIGURE 2. Those gates having a D3 signal applied thereto are provided for resetting all of the stages of the control register at the end of a particular field.

In the overall system, the print control register 22 is arranged to be set at a particular print control location by a PB signal gated into a selected print control stage PC by a signal from the manual plugboard. The PB signal will set the associated print control PC and the set state of this print control circuit will be shifted along with each character insertion into print storage PS until such time as an end of field signal is generated which will terminate the shifting operation and will clear the register for the next field selection.

Figure 7:
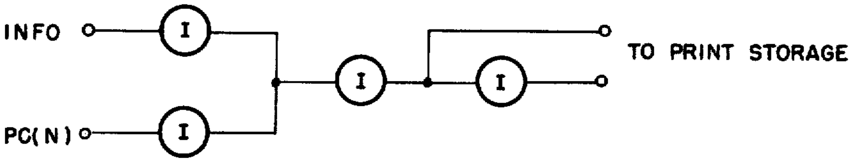
FIGURE 7 shows representative gating circuitry useful in controlling the flow of information in the present apparatus.

FIGURE 7 illustrates representative gating circuitry which may be used for transferring information into a selected print storage location. In this circuit, a pair of inverters are connected to a common terminal, the first inverter having information as an input and the second inverter having a print control signal derived from the register 22 of FIGURE 6. As long as a particular print control circuit is supplying a signal to the one inverter line, information will be able to pass through the gate combination and drop into print storage which may comprise a suitable shift register of type well known in the art.

Figure 8:
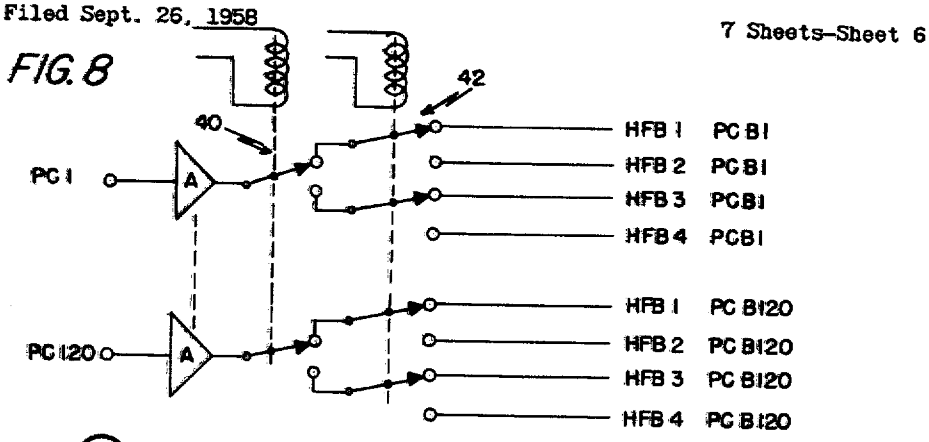
FIGURE 8 illustrates further relay selection circuitry for establishing the flow of control information through one of a plurality of plugboards.

FIGURE 8 illustrates further relay switching circuitry for connecting the print control circuits of the register 22 back to the print control B section 34 of the horizontal format board which has been selected. Controlling the switching are relays 40 and 42, or similar relays controlled thereby, arranged so that each individual print control circuit PC may be connected to the appropriate horizontal format board selected by the relays 40 and 42. The switching configuration here will be locked in with the switching operation explained above in connection with FIGURE 5.

Referring next to FIGURE 9, there is here illustrated the circuitry for generating signals to indicate that an end of field condition has been reached. It will be noted, with reference to the above discussion, that an end of field condition will be generated whenever a print control circuit PC has been plugged into a predetermined end of field condition in the section 36 of the plugboard. Thus, the inputs to the circuitry of FIGURE 9 identified by the symbols PB–EF correspond to the end field hubs from section 36 of the plugboard. Thus, the plus hubs or terminals signify the one terminals on the section 36, the U or unconditional hubs or terminals correspond to the U hubs on the section 36 and the minus hubs or terminals correspond to the zero hubs on section 36. Each of these signals are passed through associated inverters buffered to a common line which is connected to the input of another inverter operating in conjunction with a second inverter having an HFC signal input. These two inverters function in a NOR configuration to produce a further signal on output line 48. Thus, a signal will appear upon the line 48 whenever there is an end of field condition plugged to a particularly active print control location. The signal on the line 48 is passed through a further inverter where it is buffered together with a horizontal format sample time signal and will produce an input signal on a gate on the input of a flip-flop signifying end of field EF–FF. Further, the special end field signal SP–END is adapted to set the flip-flop EF–FF when such a signal is derived from the plugboard. The setting of the flip-flop EF–FF will produce a signal which is fed through a further inverter and amplifier combination to produce a signal $\overline{EOF}$. This signal is in turn applied through an inverter to a further flip-flop 6B1. This latter flip-flop is arranged to produce on the output thereof the B3 signal used in FIGURE 6 as well as the C3 signal used in FIGURE 4. These signals provide the necessary indication that an end of field condition has been created and an end of horizontal format condition has been created. The end of horizontal format signal EHF is derived from the circuitry described in FIGURE 10.

Figure 10:
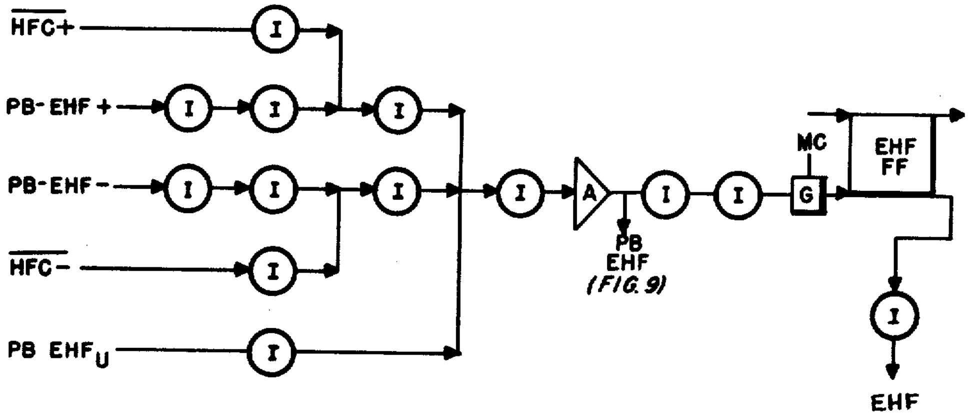
FIGURE 10 illustrates circuitry for use in indicating that the end of the horizontal format has been reached.

Referring next to FIGURE 10, the inputs to this figure bearing the designation PB–EHF are derived from the end of horizontal format hubs of section 38 on the plugboard. Thus, the plus signal of FIGURE 10 corresponds to the one hub of section 38, the minus signal in FIGURE 10 corresponds to the zero hub in section 38, while the U signal corresponds to the unconditional hub U in section 38. The signals from the plugboard are appropriately compared with the horizontal format control signals HFC derived from FIGURE 4 and, when the appropriate signal signifying end of horizontal format is received from the plugboard, an EHF signal will be created on the output of an amplifier A. A further end of horizontal format signal EHF is created on the output of a flip-flop EHF–FF also controlled by the end of horizontal format signal from the gating circuits.

Next to be considered is the overall system operation in terms of a representative example. In the assumed example, it is presumed that a control word has been appropriately inserted into the control word register 18, either automatically from tape storage or by manual means. It is further assumed that the flip-flops CW31 and CW32 each have a one stored therein or both are in the set state. When set, the horizontal format board selection relays 40 and 42 will both be energized in the manner illustrated in FIGURES 5 and 8. This means that the horizontal format board HFB1, as illustrated in FIGURE 1 will be the format board in control of the print control register 22.

It is next assumed that the control word bits in positions CW33, CW34, and CW35 are 101 respectively. It is next assumed that the first field position on the format board of section 30 has the one hub plugged to the number 1 position one in print control A section 32. It is further assumed that the print control B section 34 has its terminal at position 10 plugged to the end of field position hub one in section 36.

At the start of a particular conversion operation, a one will have been dropped into the horizontal format stepping register 26 in the HFF0 position and will then be shifted into the HFF1 position. When in the HFF1 position, a signal from the HFF1 flip-flop will combine with the $\overline{CW33}$ signal to create on the output of the output circuitry 50, the FC1 plus signal and the $\overline{HFC}$ plus signal. The FC1 plus signal is connected to the hub 1 in the first field position section 30. As set forth above, it is assumed that this number 1 position is plugged to the print control A section hub number 1. Thus, the PB signal on print control section A will be applied to the input of the print control register section PC1 of FIGURE 6. This particular circuit will be set thereby indicating that the first character is to be transferred into the print storage location controlled by the signal from PC1. Thus, in FIGURE 7, if PC1 is connected to the PC input, the character or information which is to be stored will be passed in from information storage and then passed through the gating circuitry to print storage.

After a predetermined time, as determined by the conversion and transfer time, the B3 signal is created, by means not shown, and this signal will effect a transfer of the set condition in the print control circuit PC1 to the next print control circuit PC2. This transferring will be effective to gate the next character coming in from the decoder to the next sequential print storage location through gating circuitry of the type illustrated in FIGURE 7. At the end of this information insertion, the print control circuits will shift once again to the PC3 position. This stepping and transfer will continue so that sequential print storage locations will be successively loaded by data coming in from the decoder until such time as the print control location defining the end of a particular field has been plugged to an end of field hub.

As set forth above, it is assumed that the print control B section is manually plugged from the hub 10 to the end of field hub 1 of section 36. When so plugged, and with the print control PC 10 active, a signal will be passed through the end of field circuitry of FIGURE 9 by way of the terminals PB–EF plus and $\overline{HFC}$ plus to create on the output the D3 signal which provides for resetting each of the print control stages PC1–PC120.

As soon as the end of field for field position 1 has been reached, the apparatus is then ready to look at the next field position. As stated above, the thirty-four bit position in the control register 18 is assumed to be a zero. It is assumed here that the zero hub in the second field position is plugged to hub 30 in the print control A section 32. It is further assumed that the print control B section 34 has its hub 35 plugged to the zero end of field section 36. Thus, with the apparatus stepping into the next field position as effected by way of the end of field signal of FIGURE 9 acting to create the C3 signal in FIGURE 4, the flip-flop HFF2 will now be set. With a zero in the CW34 position, the field will start at position 30 and the print control circuits PC of FIGURE 6 will be appropriately set and sequentially stepped as the data is moved a character at a time into successive print storage locations as controlled by the print control circuits PC. Again, when PC35 is energized, an end of field condition will be created by way of the manual plugging from the hub 35 of section 34 to the zero hub in section 36.

The apparatus will then sequence as before in preparation for the next field. In this case, it is assumed that the unconditional hub of field 3 is plugged to the hub 70 in print control section 32. Similarly, the end of field hub 90 may be plugged from section 34 to the end of horizontal format section 38 at the zero hub thereof. In this case, the fact that a one may have been stored in CW35 will be of no consequence since an unconditional field was called for. Thus, characters coming in through the gating circuits will be transferred to sequential storage positions in a field starting with position 70 and continuing through position 90. As soon as the print control circuit PC90 has been set, an end of horizontal format signal will be created by way of the section 38 on the plugboard and this signal will be operative in FIGURE 10 to create the EHF signal used in FIGURE 9 to clear the print control circuits. At the end of the conversion operation, the CWR0 signals in FIGURE 4 are applied to shift the horizontal field stepping register 26 to effect the clearing thereof.

Once a particular line of print has been set up in the print control circuits PC1–PC120 in the fields selected within those locations, the information may be transferred out to a suitable line printer, e.g. such as illustrated in the Rosen et al. Patent 2,805,620, issued September 10, 1957.

As described above in connection with FIGURE 2, the programmer using the present system has a wide variety of formats available extending from a single field of 120 character locations to a plurality of conditional and/or multiplexed fields arranged in any desired fashion by the manner in which the horizontal format board has been manually plugged.

It will be apparent from the foregoing discussion that a new and improved apparatus has been described for greatly minimizing the amount of manual operations required in connection with any plugboard control of the manipulation of data. Further, this improvement has been achieved with a corresponding increase in flexibility of the over-all mechanism by providing facilities for a plurality of plugboards. It will further be apparent that the principles of the present invention may be applied to numerous types of data manipulating configurations other than specific conversion of data to print as set forth above.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and which it is desired to secure by Letters Patent is:

1. In a data processing apparatus having a data path, the combination comprising a plurality of field control boards external to said path and adapted to be manually plugged, a data signal receiving means adapted to have one of said plurality of control boards selectively connected thereto, said data signal receiving means having data signals inserted therein from a data signal source via said data path in accordance with the field plugged on said one board, and means including control means responsive to said data signal source connected to select said one control board from said plurality in accordance with the status of said control means.

2. In a data processing apparatus having a data path, the combination comprising a control means, said control means comprising a register responsive to a data source for storing control data which is selectively variable for effecting a predetermined data processing, a plurality of field control boards external to said path and adapted to be manually plugged, a data receiving means adapted to have one of said plurality of control boards selectively connected thereto, said data receiving means having data inserted therein via said path from said data source in accordance with the field plugged on said one board, and means connected to said control means to sense the control data therein for selectively connecting said one control board from said plurality in accordance with the status of said control means.

3. Apparatus for automatically distributing coded data representations in a field to a plurality of separate locations in a utilization means comprising a manual plugboard having a field starting control with a plurality of start position representations comprising electrical connections each adapted to be manually plugged to start a field at a particular location, a control register having a plurality of inputs one each being connected to one each of said plurality of electrical connections, said control register acting as a serial shift register, and means connecting said control register to said utilization means to sequentially control the distribution of data thereto to selected ones of said plurality of locations.

4. Apparatus for automatically distributing coded data representations in a field to a plurality of locations in a utilization means comprising a manual plugboard having a field starting control with a plurality of start position representations comprising electrical connections each adapted to be manually plugged to start a field at a particular location, said plugboard further having a plurality of stop position representations comprising electrical connections each adapted to be manually plugged to stop a field at a particular location, a control register having a plurality of inputs one each being connected to one each of said plurality of electrical connections, said control register acting as a serial shift register, means connecting said control register to said utilization means to sequentially control the distribution of data thereto to selected ones of said plurality of locations, and means activated by a field stop signal to clear said control register.

5. Apparatus for use in processing coded data flowing in a data path from a data source comprising a first control register having stored therein a plurality of transfer instructions in the form of electrical signal representations, a second control register connected to said first register to sequentially sample selected signals in said first register, a field control board comprising a plurality of manually pluggable connections for selectively initiating predetermined fields, means connecting said first control register to said board including said second register, said data path including, a utilization means, and a field data directing register connected to said board to sequentially control the transfer of data to said utilization means starting from a point selected on said board by manual plugging.

6. Apparatus for use in processing coded data received from a data source comprising a first control register having stored therein a plurality of transfer instructions in the form of electrical signal representations, a second control register connected to said first register to sequentially sample selected signals in said first register, a field control board comprising a plurality of manually pluggable connections for selectively initiating predetermined fields, means connecting said first control register to said board including said second register, a utilization means, a field data directing register connected to said board to sequentially control the transfer of data to said utilization means starting from a point selected on said board by manual plugging, and clearing means connected to said last named register to clear said register after the transfer of data to a preselected end location in said utilization means.

7. Apparatus as defined in claim 6 wherein said second register is selectively responsive to the type of each binary coded representation in said first control register.

8. Apparatus as defined in claim 6 wherein said clearing means is responsive to the type of binary coded representation used to initiate a field at a particular point.

9. Apparatus for use in processing coded data received from a data source comprising a first control register having stored therein a plurality of transfer instructions in the form of electrical signal representations, a second control register connected to said first register to sequentially sample selected signals in said first register, a plurality of fiield control boards each comprising a plurality of manually pluggable connections for selectively initiating predetermined fields, means connected to said first control register to activate one of said plurality of field control boards, further means connecting said first control register to said selected board including said second register, a utilization means, and a field data directing register connected to said board to sequentially control the transfer of data to said utilization means starting from a point selected on said board by manual plugging.

10. Apparatus as defined in claim 9 wherein said first control register is adapted to store binary coded representations and said second control register supplies to said control board at selected positions, signals indicative of the representations in said first control register so that the start of any field will be in accordance with the said representations.

11. Apparatus for manipulating digital data comprising a digital data source, a digital data receiver, a coupling circuit means connected between said source and said receiver, a manual plugboard means external to said coupling circuit and connected thereto, and means including said plugboard connected to said receiver to feed data to said receiver in multi-digit or character fields of sensible digital data having starting and stopping locations in said receiver defined by plugging on said plugboard.

12. Apparatus for manipulating digital data comprising a digital data source, a digital data receiver, a coupling circuit means connected between said source and said receiver, a manual plugboard means external to said coupling circuit and connected thereto, and means including said plugboard connected to said receiver to feed data to said receiver in multi-digit fields of sensible digital data having starting and stopping locations in said receiver defined by plugging on said plugboard, said last named means comprising a storage register adapted to store control data derived from said data source which is selectively plugged by way of said plugboard to effect a sequential transfer of data between the starting and stopping locations.

13. Apparatus for manipulating digital data comprising a digital data source, a digital data receiver, a coupling circuit means connected between said source and said receiver, a manual plugboard means external to said coupling circuit and connected thereto, and means including said plugboard connected to said receiver to feed data selectively and conditionally to said receiver in fields of sensible digital data having starting and stopping locations in said receiver defined by plugging on said plugboard.

14. Apparatus for use in processing coded data received from a data source comprising a first control register having stored therein a plurality of transfer instructions in the form of electrical signal representations, a second control register connected to said first register to sequentially sample selected signals in said first register, a field control board comprising a plurality of manually pluggable connections, means connecting said first control register to said board including said second register, conditional signal sensing means connected to said field control board adapted to be selectively plugged to define on said board data fields of variable number and length, utilization means, and a field data directing register connected to said board to sequentially control the transfer of data to said utilization means in a field or fields defined on said board.

15. Apparatus for automatically distributing coded data representations in a field to a utilization means comprising a manual plugboard having a field starting control with a plurality of start position representations comprising electrical connections each adapted to be manually plugged to start a field at a particular location, a control register having a plurality of inputs one each being connected to one each of said plurality of electrical connections, means connecting said control register acting as a serial shift register, means connecting said control register to said utilization means to sequentially control the distribution of data thereto, and a manually pluggable electrical connection adapted to end the field at a predetermined position which defines the length of the field.

References Cited by the Examiner

UNITED STATES PATENTS

| | | | |
|---|---|---|---|
| 2,740,106 | 3/56 | Phelps | 340—163 |
| 2,826,752 | 3/58 | Hendricks | 340—163 |
| 2,918,659 | 12/59 | Gaddis et al. | 340—174 |

OTHER REFERENCES

1958, IBM Reference Manual, Ramac 305.

MALCOLM A. MORRISON, *Primary Examiner.*

IRVING L. SRAGOW, STEPHEN W. CAPELLI, EVERETT R. REYNOLDS, *Examiners.*